US010118338B2

(12) United States Patent
Deotte et al.

(10) Patent No.: US 10,118,338 B2
(45) Date of Patent: *Nov. 6, 2018

(54) ADDITIVE MANUFACTURING WITH INTEGRATED MICROLITER RESIN DELIVERY

(71) Applicant: LAWRENCE LIVERMORE NATIONAL SECURITY, LLC, Livermore, CA (US)

(72) Inventors: Joshua R. Deotte, Livermore, CA (US); Xiaoyu Zheng, Livermore, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 270 days.

This patent is subject to a terminal disclaimer.

(21) Appl. No.: 14/919,441

(22) Filed: Oct. 21, 2015

(65) Prior Publication Data

US 2017/0113418 A1 Apr. 27, 2017

(51) Int. Cl.
| B29C 64/20 | (2017.01) |
| B33Y 10/00 | (2015.01) |
| B33Y 30/00 | (2015.01) |
| B33Y 50/02 | (2015.01) |
| B29C 64/129 | (2017.01) |
| B29C 64/386 | (2017.01) |

(52) U.S. Cl.
CPC ............ *B29C 64/20* (2017.08); *B29C 64/129* (2017.08); *B29C 64/386* (2017.08); *B33Y 10/00* (2014.12); *B33Y 30/00* (2014.12); *B33Y 50/02* (2014.12)

(58) Field of Classification Search
CPC ... B29C 64/264; B29C 64/245; B29C 64/255; B29C 64/286; B29C 64/20; B29C 64/124; B33Y 30/00
See application file for complete search history.

(56) References Cited

U.S. PATENT DOCUMENTS

| 4,575,330 | A | | 3/1986 | Hull | |
| 5,011,635 | A | * | 4/1991 | Murphy | B29C 64/135 118/423 |
| 5,120,476 | A | * | 6/1992 | Scholz | B29C 67/0066 156/273.5 |
| 5,122,441 | A | * | 6/1992 | Lawton | B29C 64/129 156/58 |
| 5,174,943 | A | * | 12/1992 | Hull | B29C 35/08 156/242 |
| 5,248,456 | A | * | 9/1993 | Evans, Jr. | B33Y 40/00 118/423 |
| 5,447,822 | A | * | 9/1995 | Hull | B29C 64/135 264/401 |
| 5,573,721 | A | * | 11/1996 | Gillette | B29C 41/12 118/100 |
| 5,626,919 | A | * | 5/1997 | Chapman | B29C 41/12 118/413 |

(Continued)

*Primary Examiner* — Christopher D Rodee
(74) *Attorney, Agent, or Firm* — Eddie E. Scott

(57) ABSTRACT

An additive manufacturing system utilizing an oxygen-permeable membrane to facilitate low-volume printing and high-speed resin change in a stereolithography-based 3D printer. The membrane is used to constrain the fluid surface at the focal plane of the stereolithography printer and a carrier fluid is used to hold the fluid against the membrane. The small amount of resin is quickly switched using integrated microfluidic channels.

7 Claims, 6 Drawing Sheets

(56) References Cited

U.S. PATENT DOCUMENTS

| | | | | |
|---|---|---|---|---|
| 6,786,711 B2* | 9/2004 | Koch | .................... | B29C 64/135 |
| | | | | 425/174 |
| 6,838,035 B1* | 1/2005 | Ederer | ................ | B29C 67/0059 |
| | | | | 264/308 |
| 7,556,490 B2 | 7/2009 | Wicker et al. | | |
| 2014/0339741 A1* | 11/2014 | Aghababaie | ........... | B33Y 30/00 |
| | | | | 264/401 |
| 2015/0072293 A1* | 3/2015 | DeSimone | ............ | B29C 67/007 |
| | | | | 430/322 |
| 2016/0325493 A1* | 11/2016 | DeSimone | .......... | B29C 33/3835 |
| 2017/0173871 A1* | 6/2017 | Ermoshkin | ............ | B33Y 10/00 |
| 2017/0174827 A1* | 6/2017 | Gu | ........................ | C08G 63/08 |

\* cited by examiner

ADDITIVE MANUFACTURING WITH INTEGRATED MICROLITER RESIN DELIVERY

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to additive manufacturing and more particularly to additive manufacturing with integrated microliter resin delivery.

State of Technology

This section provides background information related to the present disclosure which is not necessarily prior art.

U.S. Pat. No. 4,575,330 for an apparatus for production of three-dimensional objects by stereolithography provides the state of technology information reproduced below.

In recent years, very sophisticated techniques have been developed for generating three-dimensional objects within a fluid medium which is selectively cured by beams of radiation brought to selective focus at prescribed intersection points within the three-dimensional volume of the fluid medium. Typical of such three-dimensional systems are those described in U.S. Pat. Nos. 4,041,476, 4,078,229, 4,238,840 and 4,288,861. All of these systems rely upon the buildup of synergistic energization at selected points deep within the fluid volume, to the exclusion of all other points in the fluid volume, using a variety of elaborate multibeam techniques. In this regard, the various approaches described in the prior art include the use of a pair of electromagnetic radiation beams directed to intersect at specified coordinates, wherein the various beams may be of the same or differing wavelengths, or where beams are used sequentially to intersect the same points rather than simultaneously, but in all cases only the beam intersection points are stimulated to sufficient energy levels to accomplish the necessary curing process for forming a three-dimensional object within the volume of the fluid medium. Unfortunately, however, such three-dimensional forming systems face a number of problems with regard to resolution and exposure control. The loss of radiation intensity and image forming resolution of the focused spots as the intersections move deeper into the fluid medium create rather obvious complex control situations. Absorption, diffusion, dispersion and diffraction all contribute to the difficulties of working deep within the fluid medium on any economical and reliable basis.

Yet there continues to be a long existing need in the design and production arts for the capability of rapidly and reliably moving from the design stage to the prototype stage and to ultimate production, particularly moving directly from computer designs for such plastic parts to virtually immediate prototypes and the facility for large scale production on an economical and automatic basis.

Accordingly, those concerned with the development and production of three-dimensional plastic objects and the like have long recognized the desirability for further improvement in more rapid, reliable, economical and automatic means which would facilitate quickly moving from a design stage to the prototype stage and to production, while avoiding the complicated focusing, alignment and exposure problems of the prior art three dimensional production systems. The present invention clearly fulfills all of these needs.

U.S. Pat. No. 7,556,490 for an apparatus for production of three-dimensional objects by stereolithography provides the state of technology information reproduced below.

Rapid prototyping (RP) technologies, also known as Solid Freeform Fabrication (SFF), layered manufacturing and other similar technologies enable the manufacture of complex three-dimensional (3D) parts. RP technologies, in particular, generally construct parts by building one layer at a time. RP technologies are commonly used to build parts and prototypes for use in, for example, the toy, automotive, aircraft and medical industries. Oftentimes prototypes made by RP technologies aid in research and development and provide a low cost alternative to traditional prototyping. In a few cases, RP technologies have been used in medical applications such as those associated with reconstructive surgery and tissue engineering (TE).

Stereolithography (SL) is one of the most widely used RP technologies known in the art. The resolution of SL machines and the ability of SL to manufacture highly complex 3D objects, make SL ideal for building both functional and non-functional prototypes. In particular, SL techniques provide an economical, physical model of objects quickly and prior to making more expensive finished parts. The models are readily customizable and changes may be easily implemented.

SL generally involves a multi-stage process. For example, the first stage involves designing and inputting a precise mathematical geometric description of the desired structure's shape into one of many computer-aided design (CAD) programs and saving the description in the standard transform language (STL) file format. In the second stage, the STL file is imported into SL machine-specific software (RP software). The RP software slices the design into layers and determines the placement of support structures to hold each cross-section in place while building the structure layer by layer. By computing build parameters, the RP software controls the part's fabrication. In the layer preparation stage, the build parameters for the desired part are translated into machine language. Finally, the machine language controls the SL machine to build a desired part and its support structure layer by layer. SL machines typically focus an ultraviolet (UV) laser onto a cross-section of a liquid photopolymer resin. The laser, in turn, selectively cures a resin to form a structure, such as anatomical shapes (i.e., organs and tissues), layer by layer. Ultimately, the part is cleaned, the support structure is removed and the part is post-cured (typically exposed to UV) prior to completion.

SL technologies known in the art generally include, for example, a laser, a liquid level sensing system, laser beam optics and controllable mirror system, a vertically movable platform, single resin retaining receptacle or vat and a recoating device. During the laser scanning phase, a series of optics and controllable mirrors raster a UV laser beam to solidify a photocurable polymer resin. The subject 3D part is first attached to the platform by building a support structure with the platform in its topmost position. This step allows for misalignment between the platform and the surface of the liquid resin—once constructed, the base support structure is parallel with the surface of the liquid. When building the subject part simultaneously with its required support structure and after the laser beam completes a layer, the platform typically is vertically traversed downward a distance equal to the build layer thickness. After the platform is vertically traversed downward and prior to selectively curing the next layer, a recoating device is typically traversed horizontally across the part that deposits a uniform layer of liquid polymer across the part. The recoating device ensures that trapped spaces within the part are filled with liquid resin (which may be required for future build layers), and is used to maintain a constant build layer thickness. The process repeats as each layer is built. Complex-shaped parts are thus manufactured by repeating the layering process. Once complete, the part is typically raised out of the liquid polymer, the support structure is removed from the part and the part is cleaned and then post-cured. The operator may, however, need to sand, file or use some other finishing technique on the part in order to provide a specific surface finish to the structure, which may include painting, plating and/or coating the surface.

TE techniques, in particular, rely on necessary fluids, growth factors and cells to perfuse through the pores of a scaffold (a supporting structural and potentially bioactive framework used in tissue engineering for directed cell growth). One of the most challenging problems in TE involves promoting cell in-growth and perfusion to seeded cells in implanted scaffolds. The diffusion of oxygen and nutrients is not sufficient to sustain cell viability beyond distances of approximately 100 microns in the body. TE techniques, therefore, must retain precise control over the resulting 3D geometry to design favorable perfusion into a scaffold thus maintaining cell viability. SL technologies allow direct manufacturing of perfusion promoting implantable scaffolds. Hydrogels are biocompatible materials that exhibit favorable perfusion characteristics and are currently used in photolithographic processes using manual lithographic masking techniques as well as a variety of other processes. Implantable multi-material hydrogel constructs, however, are not currently suited for single material SL machines known in the art.

Accordingly, improvements in part building technology are desired. Specifically, there is a need for a low cost, efficient and easy to use stereolithography system that accommodates multiple building materials or resins. What is desired is a system that maintains a non-contaminating and sterile building environment while accommodating intermediate cleaning and curing between materials and/or resins. For example, when building biomedical implantable structures and/or devices, it is imperative to maintain a sterile building environment. It is equally important that resin or resin residue from one portion of the build does not contaminate any other resin when building with multiple materials, and thus, intermediate washing between materials is a critical element of the desired system. What is also desired is a multiple resin system to directly manufacture complex multiple-material, functional and non-functional prototypes and finished devices. What is further desired is an SL system that accommodates building multiple material, implantable hydrogel structures and other microstructures. What is still further desired is an SL system that allows additives, such as color (pigments, dyes and other color additives known in the art), to incorporate into resins on a layer by layer basis. Still another desire is to have a system that allows other resin additives and/or other materials (as in part embedding or cell seeding) to alter characteristics, such as the strength, mechanical, optical, thermal, electrical, functional and bio-functional properties of the resin and/or resulting model on a layer by layer basis or even within a single layer.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

Recent stereolithography systems have focused on improving build speed and resolution with little advancement in material handling. The majority of existing stereolithography printers are limited to a single feed material for the entire build. The inventor's apparatus, systems, and methods provide additive manufacturing utilizing an oxygen-permeable membrane to facilitate low-volume printing and high-speed resin change in a stereolithography-based 3D printer. The membrane is used to constrain the fluid surface at the focal plane of the stereolithography printer and a carrier fluid is used to hold the fluid against the membrane. The small amount of resin is quickly switched using integrated microfluidic channels. The inventor's apparatus, systems, and methods have use in the areas listed below.

Bioengineering: A microfluidic delivery system loaded with different cell types could be used to pattern structures containing complex tissues that more closely represent histological organizations of cell types.

Metamaterials: Cycling resins as the part is being fabricated can lead to unique mechanical properties or tailored deformation. This could be used to tailoring thermal expansion, crush properties, modulus, or density.

Multifunctional materials: Cycling resin between structural polymer and functionalized polymer (e.g. conducting polymers) will allow monolithic fabrication of structures with integrated functionality. For example, a hydrogel lattice could be constructed with integrated electrical pathways for monitoring potentials within the structure.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1A:
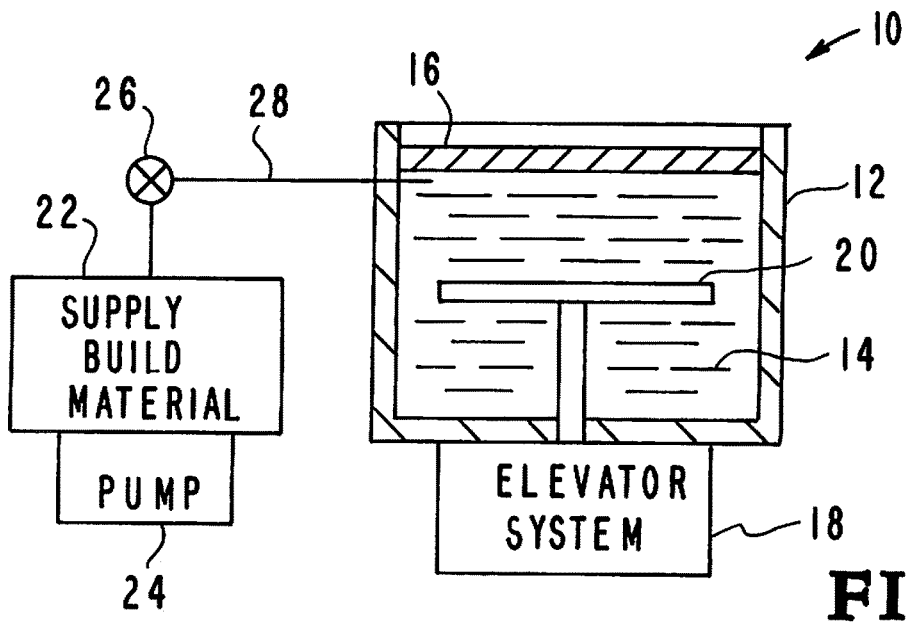
FIGS. 1A-1E illustrate an embodiment of the inventor's membrane stereolithography with microfluidic resin delivery apparatus, systems, and methods.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

The inventor's apparatus, systems, and methods provide additive manufacturing utilizing an oxygen-permeable membrane to facilitate low-volume printing and high-speed resin change in a stereolithography-based 3D printer. The membrane is used to constrain the fluid surface at the focal plane of the SL printer and a carrier fluid is used to hold the fluid against the membrane. The small amount of resin is quickly switched using integrated microfluidic channels.

In one embodiment the inventor's apparatus, systems, and methods provide an addition to a stereolithography 3d printer. It consists of an oxygen-permeable membrane with patterned channels and a reservoir. The build substrate is located within the reservoir and moved away from the membrane as fabrication progresses. The photopattern is projected through the membrane and the thin surface of the reservoir. On the sides of the reservoir, channels are patterned to allow addition and removal of material. This embodiment of the inventor's apparatus, systems, and methods includes the following steps:

1. Alight substrate into starting position
2. Fill reservoir with starting printer fluid
3. Project first photopattern, polymerizing the first layer
4. Lower the stage by the specified layer thickness
5. Cycle the fluid through the inlet/outlet ports on the device.
6. Expose next photomask
7. Repeat steps 4-6 until structure is complete, optionally omitting step 5 if material change is unnecessary The inventor's process is the use of surface tension to pin the resin within the build area. This serves to allow a very small volume of material (<10 uL for 1 mm2 footprint) to be used, thereby reducing waste. Furthermore, the integration with the membrane allows for printing materials with high surface tension that would otherwise tend to form a curved print surface.

As fabrication progresses, the steady-state geometry of the resin changes. Initially, the fluid completely fills the void between the substrate and window. As the part extends, this no longer is stable and the interface collapses. When this occurs, some material will remain trapped at the bottom interface. The remaining material, and the changeable material, will stay at the top surface between the carrier fluid and the window. This is the region that will be used for printing additional layers and can still be cycled using the flow chambers.

Referring to the drawings and in particular to FIGS. 1A through 1E one embodiment of the disclosed additive manufacturing apparatus, systems, and methods is illustrated. This embodiment is designated generally by the reference numeral 10. FIGS. 1A through 1E provide schematic depictions illustrating the additive manufacturing apparatus, systems, and methods 10. FIGS. 1A through 1E show the structural elements identified and described below.

Reference numeral 10—membrane stereolithography with microfluidic resin delivery system (MSMRD).
Reference numeral 12—reservoir
Reference numeral 14—immiscible fluid (oil/aqueous solution)
Reference numeral 16—membrane (optically transparent and porous to gasses including oxygen)
Reference numeral 18—elevator system
Reference numeral 20—substrate
Reference numeral 22—supply build material
Reference numeral 24—pump
Reference numeral 26—valve
Reference numeral 28—delivery port
Reference numeral 30—puddle of build material
Reference numeral 32—first layer material
Reference numeral 34—pockets of excess build material
Reference numeral 36—first projected image from STL system
Reference numeral 38—object The structural elements of the system 10 having been identified and described, the operation of the system 10 will now be considered. The system 10 is a stereolithography system for making a solid object by successively printing thin layers of a UV curable material, one on top of the other. A 3-D CAD system creates a model which is sliced into layers. The first layer is sent to a projection system and subsequently projected to the appropriate location as image on the build plane. A programmed movable spot beam of UV light shining on a surface or layer of UV curable liquid is used to form a solid cross-section of the object at the surface of the liquid. The object is then moved, in a programmed manner, away from the liquid surface by the thickness of one layer and the next cross-section is then formed and adhered to the immediately preceding layer defining the object. This process is continued until the entire object is formed.

FIG. 1A illustrates the membrane stereolithography with microfluidic resin delivery system (MSMRD) 10 in its basic form. The system 10 has a reservoir 12 that is filled with an immiscible fluid 14 (oil or aqueous solution). An elevator system 18 positions a substrate 20 within the fluid 14 filled reservoir 12. A pump 24 delivers build material 22 through valve 26 and delivery port 28 into the reservoir 12.

Figure 1B:
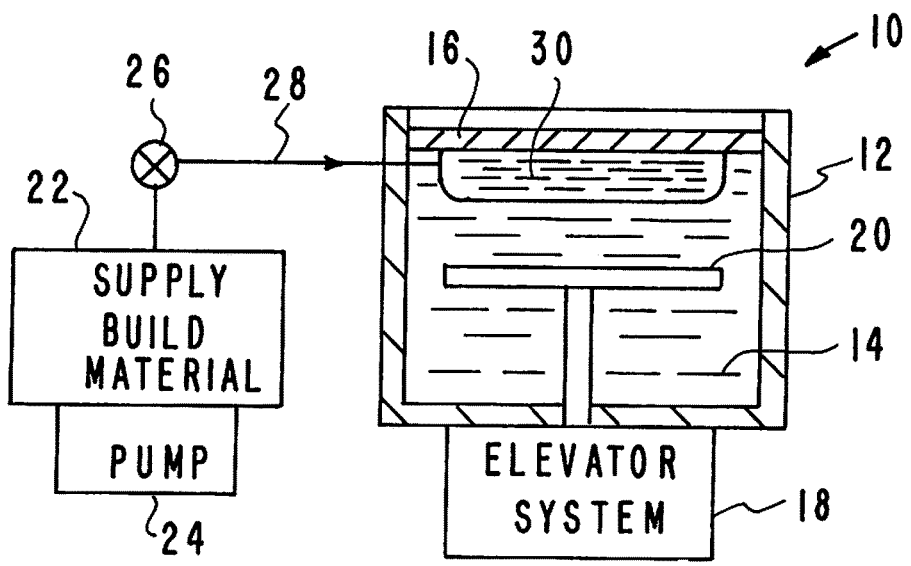

FIG. 1B shows a puddle 30 of build material 22 that has been injected into the reservoir 12. The build material 22 will not mix with the immiscible fluid 14 so it forms a puddle 30 that floats on the fluid 14.

Figure 1C:
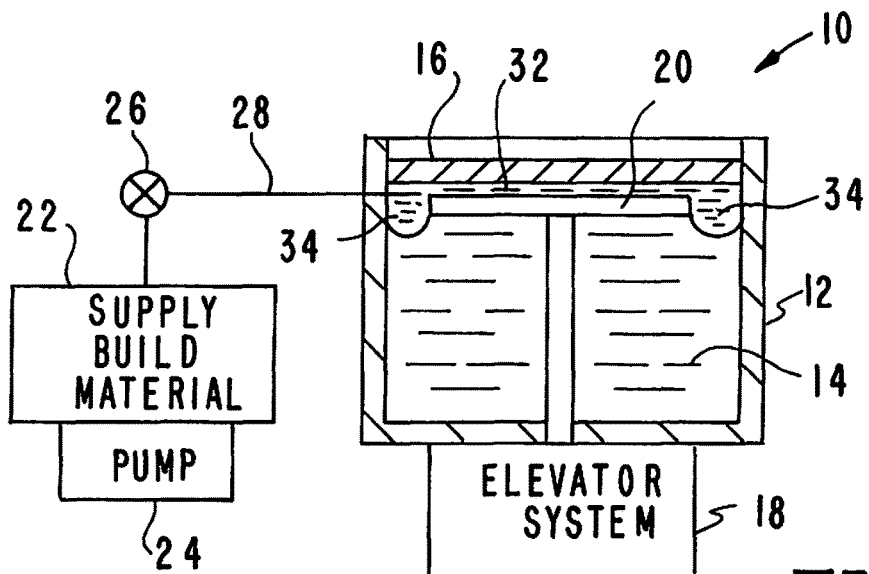

In FIG. 1C the elevator system 18 has positioned the substrate 20 to a position that forms a thin (5-10 µm) layer 32 of build material 22. The build material layer 32 contains less than ten microliters of build material. Membrane 16 is an oxygen permeable membrane that allows oxygen to enter the system. The oxygen prevents the build material 22 from sticking to the membrane 16. The layer 32 of build material 22 will form the first layer of the object being constructed. The excess build material 22 forms pockets 34 of material that can be recovered.

Figure 1D:
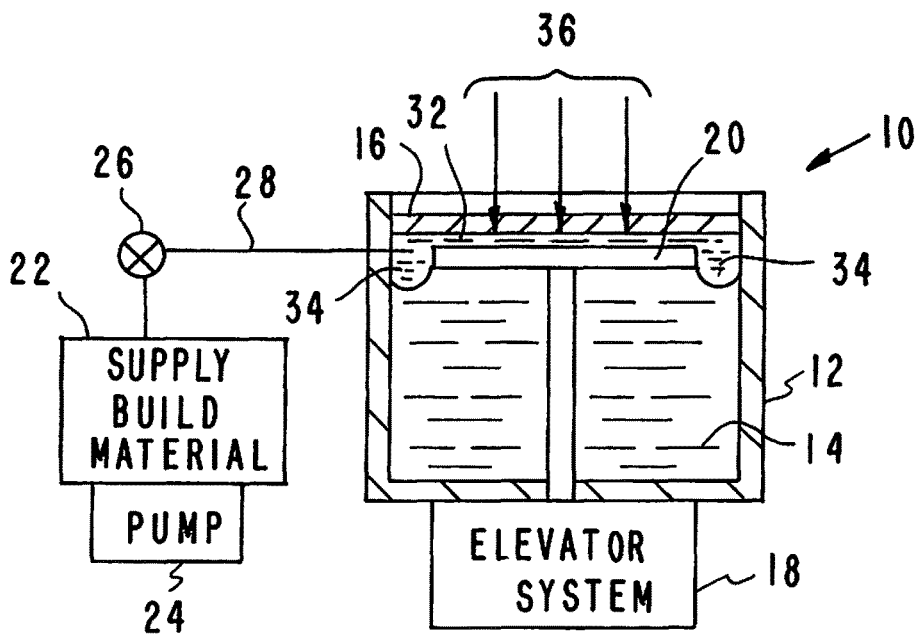

FIG. 1D shows a first projected image 36 from a stereolithography system (not shown). The projected image 36 passes through the optically transparent membrane 16 and creates the first layer of an object being formed from build material 22.

Figure 1E:
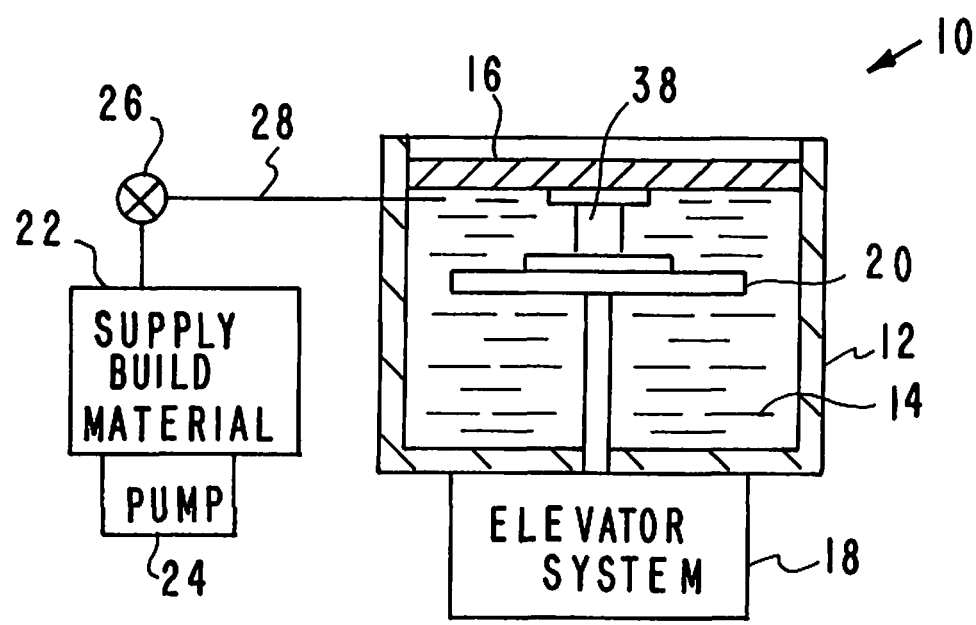

FIG. 1E illustrates that after the specified number of layers have been laid down the system 10 will have completed the object 38. The object 38 is removed from the substrate 20 and the system 10.

Figure 2:
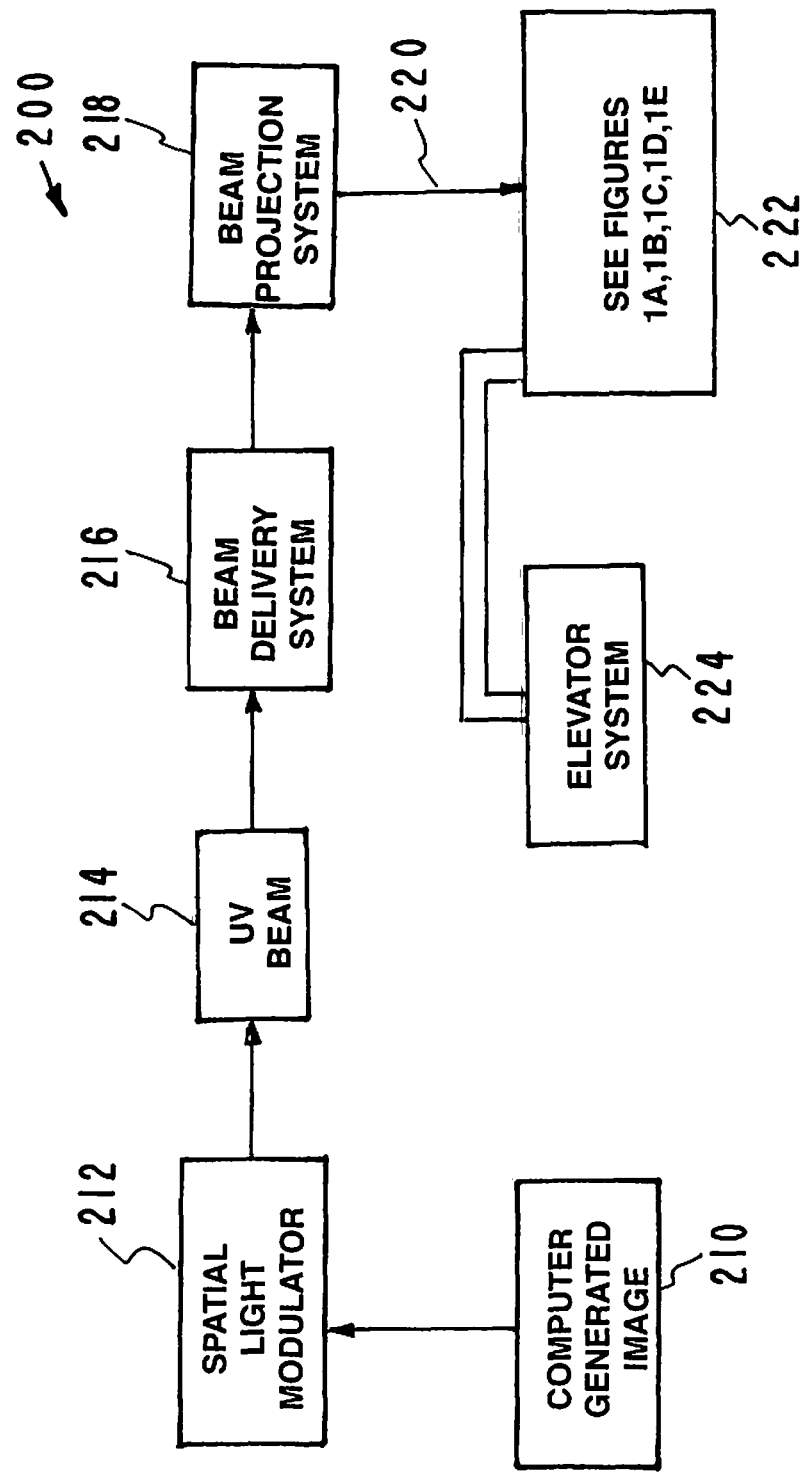
FIG. 2 is an illustrative diagram showing another embodiment of the inventor's additive manufacturing apparatus, systems, and methods.

Referring to FIG. 2, an illustrative diagram shows another embodiment of the inventor's additive manufacturing apparatus, systems, and methods. This embodiment is designated generally by the reference numeral 200. The embodiment 200 is a stereo micro lithography system. A series of steps are illustrated in the depiction of the inventor's stereo micro lithography system 200.

In the first step 210, a computer generated image is produced. A 3D solid model of the structure to be complete is designed by, any suitable method, e.g., by bit mapping or by computer aided design (CAD) software at a PC/controller. The model is electronically sliced into series of 2-dimensional data files, i.e., 2D layers, each defining a planar cross section through the 3D preform of the complex product to be constructed, and which may be individually stored.

In the next step, step 212, a digital image of the first layer is projected by a spatial light modulator. A Lcos chip can be used for the projection. The next step, step 214, is the projection of a UV beam containing the digital image of the first layer.

In the next step, step 216, a beam delivery system is used to produce a beam containing the digital image of the first layer. The next step, step 218, uses a beam projection system to project the digital image of the first layer in focus at a particular plane in a photoresist/photo-curable composition in a supporting container so that the actinic light preferentially exposes the desired layer to cure it. The projecting beam 220 is directed into the photoresist/photo-curable composition.

In the next step, step 222, the system of additive manufacturing illustrated in FIGS. 1A through 1E are used to build the structure. Step 222 utilizes an oxygen-permeable membrane to facilitate low-volume printing and high-speed resin change in a stereolithography-based 3D printer. The membrane is used to constrain the fluid surface at the focal plane of the SL printer and a carrier fluid is used to hold the fluid against the membrane. The small amount of resin is quickly switched using integrated microfluidic channels. After one layer is cured the composition and focusing optics undergo relative movement by an elevator system 224 that moves the build platform. The layer-by-layer process continues until all 3D layers of the structure are completed.

Figure 3:
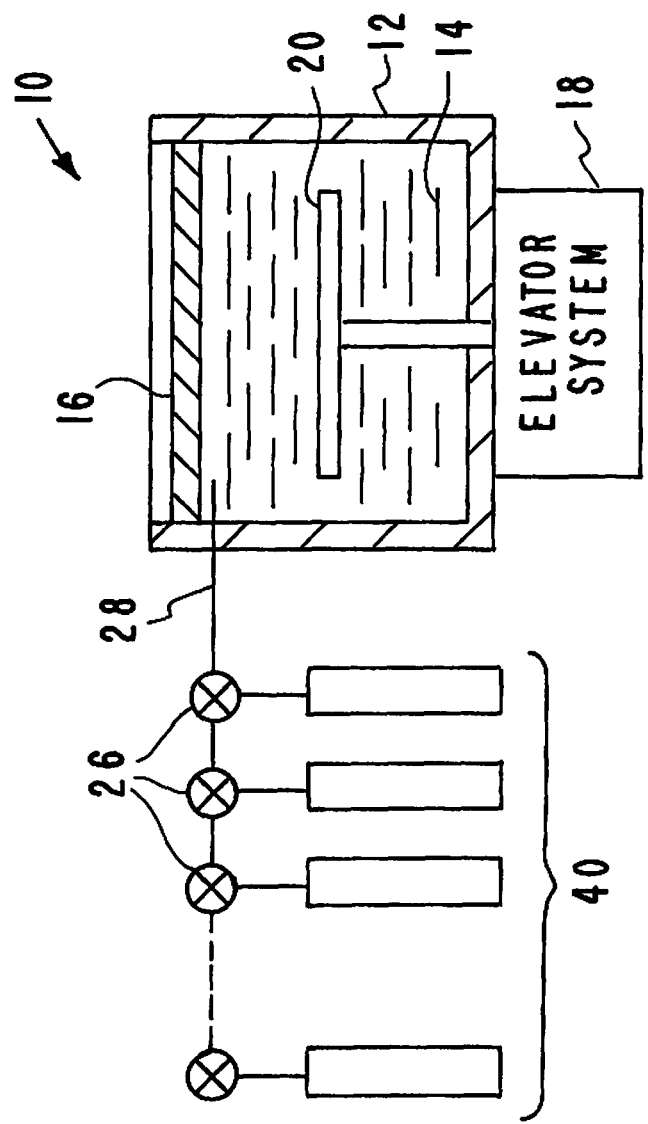
FIG. 3 illustrates an embodiment of the microfluidic resin delivery system.

Referring to FIG. 3 another embodiment of the disclosed additive manufacturing apparatus, systems, and methods is illustrated. This embodiment illustrates an embodiment of the microfluidic resin delivery system. The numeral used in FIGS. 1A through 1E are also used in FIG. 3. The structural elements of FIG. 3 are identified and described below.

Reference numeral 10—membrane stereolithography with microfluidic resin delivery system (MSMRD).
Reference numeral 12—reservoir
Reference numeral 14—immiscible fluid (oil/aqueous solution)
Reference numeral 16—membrane (optically transparent and porous to gasses)
Reference numeral 18—elevator system
Reference numeral 20—substrate
Reference numeral 26—valves
Reference numeral 28—delivery port
Reference numeral 40—multiple containers of various build materials The structural elements of the system 10 having been identified and described, the operation of the system 10 of FIG. 3 will now be considered. The system 10 has a reservoir 12 that is filled with an immiscible fluid 14 (oil or aqueous solution). The elevator system 18 positions substrate 20 within the fluid 14 filled reservoir 12.

As illustrated in FIG. 3 multiple containers of various build materials 40 are connected together by valves 26. The multiple containers of various build materials 40 provide a desired formula of build material to produce the structure being produced.

The build material 40 is delivered through valve 26 and delivery port 28 into the reservoir 12. The build material 40 will form a layer of build material on the immiscible fluid 14. The build material 40 will not mix with the immiscible fluid 14 and therefore the layer of build material 40 floats on the immiscible fluid 14. The build material layer contains less than ten microliters of build material 40. The layer of build material 40 has a thickness of five to ten micrometers.

Figure 4:
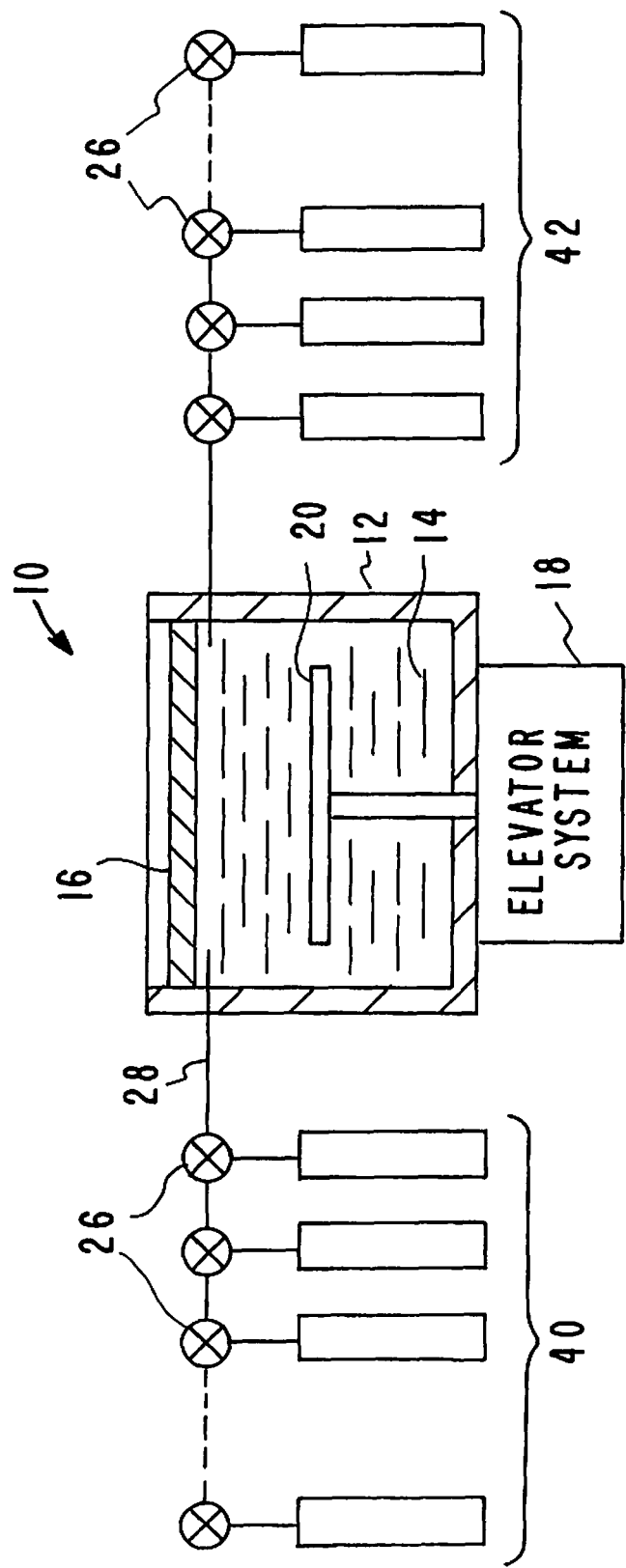
FIG. 4 illustrates an embodiment of the microfluidic resin delivery system with a system for recovery of build materials.

Referring to FIG. 4 another embodiment of the disclosed additive manufacturing apparatus, systems, and methods is illustrated. This embodiment illustrates an embodiment of the microfluidic resin delivery system with a system for recovery of build materials. The numeral used in FIGS. 1A through 1E are also used in FIG. 4. The structural elements of FIG. 4 are identified and described below.

Reference numeral 10—membrane stereolithography with microfluidic resin delivery system (MSMRD).
Reference numeral 12—reservoir
Reference numeral 14—immiscible fluid (oil/aqueous solution)
Reference numeral 16—membrane (optically transparent and porous to gasses)
Reference numeral 18—elevator system
Reference numeral 20—substrate
Reference numeral 26—valves
Reference numeral 28—delivery port
Reference numeral 40—multiple containers of various build materials
Reference numeral 42—multiple containers for recovery of build materials The structural elements of the system 10 having been identified and described, the operation of the system 10 of FIG. 4 will now be considered. The system 10 has a reservoir 12 that is filled with an immiscible fluid 14 (oil or aqueous solution). The elevator system 18 positions substrate 20 within the fluid 14 filled reservoir 12.

As illustrated in FIG. 4 multiple containers of various build materials 40 are connected together by valves 26. The multiple containers of various build materials 40 provide a desired formula of build material to produce the structure being produced.

The build material 40 is delivered through valve 26 and delivery port 28 into the reservoir 12. The build material 40 will form a layer of build material on the immiscible fluid 14. The build material 40 will not mix with the immiscible fluid 14 and therefore the layer of build material 40 floats on the immiscible fluid 14. The build material layer contains less than ten microliters of build material 40. The layer of build material 40 has a thickness of five to ten micrometers. Multiple containers 42 for recovery of build materials are connected to the reservoir. Excess building material 40 is collected from the layer of build material by valves 26.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An additive manufacturing apparatus for building a structure, comprising:
   a reservoir, wherein said reservoir has one reservoir side and an opposite reservoir side;
   an immiscible fluid in said reservoir;
   a substrate in said reservoir that is totally immersed in said immiscible fluid;
   an oxygen permeable and optically transparent membrane operatively connected to said reservoir, wherein said oxygen permeable and optically transparent membrane is positioned to extend from said one reservoir side to said opposite reservoir side;
   a microliter amount of curable resin;
   a delivery system for delivering said microliter amount of curable resin to said reservoir in contact with said immiscible fluid in said reservoir, wherein said microliter amount of curable resin is contained in said reservoir by said immiscible fluid, said oxygen permeable and optically transparent membrane, and said substrate;
   an elevator system in said reservoir for moving said substrate and said microliter amount of curable resin; and
   an energy source adapted to deliver energy to said reservoir through said oxygen permeable and optically transparent membrane onto said microliter amount of curable resin for building the structure.

2. The additive manufacturing apparatus for building a structure of claim 1 wherein said microliter amount of curable resin is less than ten microliters.

3. The additive manufacturing apparatus for building a structure of claim 1 wherein said energy source is a light source.

4. The additive manufacturing apparatus for building a structure of claim 1 wherein said energy source is an ultra violet light source.

5. The additive manufacturing apparatus for building a structure of claim 1 wherein said immiscible fluid in said reservoir is oil.

6. The additive manufacturing apparatus for building a structure of claim 1 wherein said immiscible fluid in said reservoir is an aqueous solution.

7. The additive manufacturing apparatus for building a structure of claim 1 further comprising multiple containers for recovery of said microliter amount of curable resin.

* * * * *